United States Patent
Dalgliesh

(10) Patent No.: US 11,870,763 B2
(45) Date of Patent: Jan. 9, 2024

(54) SYSTEMS AND METHODS FOR INTER-SYSTEM ACCOUNT IDENTIFICATION

(71) Applicants: Atlassian Pty Ltd., Sydney (AU); Atlassian Inc., San Francisco, CA (US)

(72) Inventor: Eric Dalgliesh, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 280 days.

(21) Appl. No.: 16/913,678

(22) Filed: Jun. 26, 2020

(65) Prior Publication Data

US 2021/0409387 A1    Dec. 30, 2021

(51) Int. Cl.
*H04L 9/40* (2022.01)
*G06F 16/24* (2019.01)
*G06F 7/58* (2006.01)

(52) U.S. Cl.
CPC .............. *H04L 63/08* (2013.01); *G06F 16/24* (2019.01); *H04L 63/0428* (2013.01); *G06F 7/588* (2013.01)

(58) Field of Classification Search
CPC ...... H04L 63/08; H04L 63/0428; G06F 16/24
USPC .......................................................... 726/3
See application file for complete search history.

(56) References Cited

U.S. PATENT DOCUMENTS

| | | | | |
|---|---|---|---|---|
| 9,100,810 B2 * | 8/2015 | Schell | ................... | H04W 8/205 |
| 9,549,313 B2 * | 1/2017 | Park | ..................... | H04W 12/04 |
| 9,571,461 B2 * | 2/2017 | van Ham | ................ | H04L 51/48 |
| 9,589,122 B2 * | 3/2017 | Song | ..................... | G06F 21/335 |
| 9,900,321 B2 * | 2/2018 | Zhou | ..................... | H04L 63/205 |
| 10,614,463 B1 * | 4/2020 | Hockey | ................ | G06Q 20/023 |
| 11,122,056 B2 * | 9/2021 | Sundar | ................... | G06F 16/00 |
| 11,395,133 B2 * | 7/2022 | Kim | ..................... | H04W 12/72 |
| 2009/0164579 A1 * | 6/2009 | Chaudhry | ......... | H04N 21/4334 709/205 |
| 2012/0066034 A1 * | 3/2012 | Nolan | ................... | G06Q 40/02 705/14.1 |
| 2016/0034503 A1 * | 2/2016 | Morozov | ............. | G06F 16/951 707/706 |

(Continued)

*Primary Examiner* — Dant B Shaifer Harriman

(74) *Attorney, Agent, or Firm* — Brownstein Hyatt Farber Schreck, LLP

(57) ABSTRACT

Systems and methods for identifying and transacting with accounts across multiple external systems using inter-system account identifiers, without exposing internal account identifiers of an originating system, are disclosed. An example method, executed by the originating system, includes generating a first and a second inter-system account identifier based on a first and a second request, respectively, received at the originating system from a first and a second external system, respectively, that provide different services to an internal account of the originating system. The first and second inter-system account identifiers are communicated to the first and the second external system, respectively. When a data communication including the first inter-system account identifier and payload data is received from the first external system, the first internal account is retrieved using the first inter-system account identifier, the payload data is associated with the first internal account, and stored in an originating system data store.

20 Claims, 6 Drawing Sheets

(56) References Cited

U.S. PATENT DOCUMENTS

| | | | |
|---|---|---|---|
| 2016/0119319 A1* | 4/2016 | Hua | H04L 67/02 |
| | | | 726/9 |
| 2016/0255053 A1* | 9/2016 | Turner | G06Q 30/0271 |
| | | | 726/12 |
| 2016/0358259 A1* | 12/2016 | Cucchiara | G06Q 40/06 |
| 2018/0025295 A1* | 1/2018 | Levin | G06Q 10/02 |
| | | | 235/382 |
| 2018/0247068 A1* | 8/2018 | Levin | H04L 63/101 |
| 2019/0114340 A1* | 4/2019 | Feijoo | H04L 63/0884 |
| 2019/0354716 A1* | 11/2019 | Basava | G06F 16/2379 |
| 2020/0104843 A1* | 4/2020 | Bhasin | G06Q 20/4015 |
| 2020/0183978 A1* | 6/2020 | Greene | G06F 16/901 |
| 2020/0366678 A1* | 11/2020 | Mutha | H04L 63/0815 |
| 2021/0368335 A1* | 11/2021 | Wang | H04W 12/02 |
| 2022/0311771 A1* | 9/2022 | Kato | G06F 21/31 |

\* cited by examiner

US 11,870,763 B2

SYSTEMS AND METHODS FOR INTER-SYSTEM ACCOUNT IDENTIFICATION

TECHNICAL FIELD

The present disclosure is generally directed to user-account data and, more specifically, directed to systems and methods for identifying and using accounts across multiple systems using inter-system account identifiers.

BACKGROUND

The vast majority of computer systems make use of user accounts. User accounts serve various purposes, for example, to identify users, to track information in respect of users, and to implement permissions. Independent systems maintain their own, independent accounts for users. For example, where an individual is a user of two independent systems A and B, that user will have one account with system A and a separate/independent account with system B.

There are many scenarios where it is useful for one computer system to be able to identify an account maintained by another system. However, there are multiple technical challenges that prevent traditional systems from sharing user accounts and user account data.

SUMMARY

Some example embodiments are directed to a computer implemented method. The method may include receiving a first request which is a request to generate a first inter-system account identifier and is associated with a first external system and a first internal account. A first inter-system account identifier is then generated. The first inter-system account identifier corresponds to the first external system and the first internal account. The first inter-system account identifier is communicated to the first external system. The method may also include receiving a second request, which is a request to generate a second inter-system account identifier and is associated with a second external system and the first internal account. A second inter-system account identifier is then generated. The second inter-system account identifier corresponds to the second external system and the first internal account. The second inter-system account identifier may be different than the first inter-system account identifier. The second inter-system account identifier is communicated to the second external system.

In some embodiments, the first inter-system account identifier is a first universally unique identifier, and the second inter-system account identifier is a second universally unique identifier. In some cases, generating a particular inter-system account identifier corresponding to a particular external system and a particular internal account includes: generating a random number; determining if the random number is already in use as an inter-system account identifier; and in response to determining that the random number is not already in use, using the random number as the particular inter-system account identifier.

In some embodiments, the first inter-system account identifier is stored in a data store and the first inter-system account identifier is associated with the first internal account. The second inter-system account identifier may also be stored in the data store and may be associated with the first internal account. In some implementations, the first inter-system account identifier is also associated with the first external system; and the second inter-system account identifier is also associated with the second external system.

In some implementations, a communication from the first external system is received, the communication including the first inter-system account identifier and a payload. The data store may be queried to determine that the first inter-system account identifier is associated with the first internal account. Data based on the payload may be associated with the first internal account.

In some cases, generating a particular inter-system account identifier corresponding to a particular external system and a particular internal account comprises: retrieving particular inter-system account identifier generation data from a data store, the particular inter-system account identifier generation data being associated with the particular external system; and generating the particular inter-system account identifier using the particular inter-system account identifier generation data and an internal account identifier associated with the particular internal account. The particular inter-system account identifier may not be stored by a system that generates the particular inter-system account identifier.

In some cases, the method further comprises: receiving a communication from a specific external system, the communication including a specific inter-system account identifier and a payload; retrieving, from the data store, inter-system account identifier generation data that is associated with the specific external system; calculating an internal account identifier based on the inter-system account identifier included in the communication and the inter-system account identifier generation data that is associated with the specific external system; and associating data based on the payload with the internal account identifier.

The inter-system account identifier generation data that is associated with the specific external system may include a symmetric encryption key. Calculation of the internal account identifier may be based on the symmetric encryption key and the inter-system account identifier included in the communication. The inter-system account identifier generation data that is associated with the specific external system may include an encryption key and a decryption key. Calculation of the internal account identifier may be based on the decryption key and the inter-system account identifier included in the communication.

In some instance, prior to generating the particular inter-system account identifier corresponding to the particular external system and the particular internal account, the method further comprises: generating the particular inter-system account identifier generation data; and storing the particular inter-system account identifier generation data in the data store, the particular inter-system account identifier generation data being associated with the particular external system.

Some example embodiments are directed to computer processing system comprising: one or more processing units; one or more communications interfaces; and a non-transient computer-readable storage medium storing a set of instructions which, when executed by the one or more processing units, cause the one or more processing units to perform a series of operations. The operations may include, for example, receiving, by the one or more communications interfaces, a first request, the first request being a request to generate a first inter-system account identifier and being associated with a first external system and a first internal account; generating, by the one or more processing units, the first inter-system account identifier, the first inter-system account identifier corresponding to the first external system and the first internal account; communicating the first inter-system account identifier to the first external system; receiving a second request, the second request being a request to generate a second inter-system account identifier and being associated with a second external system and the first internal account; generating the second inter-system account identifier, the second inter-system account identifier corresponding to the second external system and the first internal account, the second inter-system account identifier being different to the first inter-system account identifier; and communicating the second inter-system account identifier to the second external system.

Figure 1:
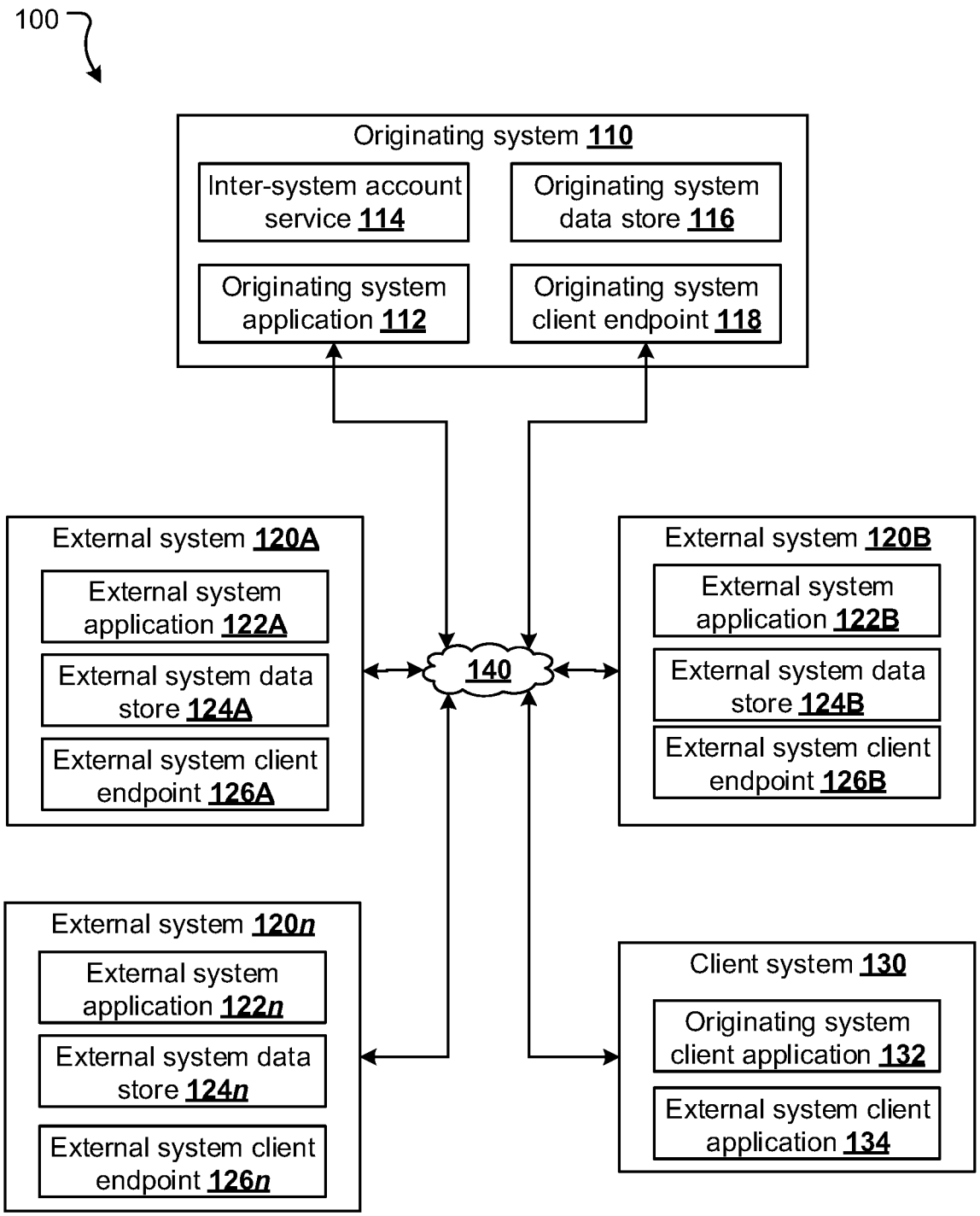
FIG. 1 is a diagram depicting a networked environment in which various features of the present disclosure may be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION OF THE EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The present disclosure is generally directed to systems and methods for generating and using inter-system account identifiers. In the present disclosure, an inter-system account identifier (or IS account identifier for short) refers to an identifier that can be used by one system (referred to herein as an external system, ES) to identify an internal account maintained by another system (referred to herein as a originating system, OS). By using an IS account identifier, an external system can store data relating to a particular originating system account and communicate such data to the originating system without requiring the originating system's actual account identifier. Similarly, the originating system can associate data which is managed by/retrieved from an external system with an internal originating system account without exposing its internal account identifier.

There are innumerable example use cases where having a mechanism to identify an account maintained by another system and associate data with that account is useful. As but one example, a customer resource management (CRM) system (in this case an example of an originating system) may store data about a person: their telephone number, email address, physical mailing address, and other data. An operator of the CRM system may file issues/tickets that relate to that person in a separate issue tracking system (in this case an example of an external system). In this case the CRM system needs a way of representing the user in question to the issue tracking system, ideally without exposing the CRM system's internal identifier for the person to the issue tracking system. In this case, and as described below, the CRM can generate an inter-system identifier which can be provided to the issue tracking system and used to identify the user in question in data maintained by the separate issue tracking system.

Turning to FIG. 1, a networked environment 100 in which the various operations and techniques described herein can be performed will be described.

Networked environment 100 includes what will be referred to as a originating system 110, one or more external systems 120 (in this case three external systems, 120A, 120B, and 120n), and one or more client systems 130 (one client system being depicted, however multiple client systems will typically be involved). The originating system 110, external systems 120, and client system(s) 130 communicate with one another via one or more communications networks 140 (e.g. the Internet).

For convenience, at times in this disclosure the acronym OS will be used in place of 'originating system' and the acronym ES in place of 'external system'.

An originating system 110 or external system 120 may be any system that provides services. Relevantly to the present disclosure, however, during operation an originating system 110 communicates data to an external system 120 that (as discussed in detail below) needs to be associated with an originating system account.

In order not to obscure the relevant features of the present disclosure, simplified originating and external systems 110 and 120 have been depicted and described. Only components and functionality associated with sending/receiving data and identifying the relevant originating system account are described. The originating and external systems 110 and 120 will, however, include additional applications/components to those illustrated.

By way of example, the originating system 110 may be an issue tracking system and an external system 120 may be a customer relationship management system. In this case, the originating system 110 will include additional applications/components for performing the 'normal' functions of an issue tracking system and the external system 120 will include additional applications/components for performing the 'normal' functions of a CRM system.

In the present example, the originating system 110 includes an originating system application 112. The originating system application 112 performs various functions, including communicating data to external systems 120 (for example to external system applications 122) and receiving/retrieving data from external systems 120 (for example from external system applications 122)

The originating system 110 also includes an inter-system (IS) account service 114. As described in detail below, the IS account service 114 performs processing to generate inter-system account identifiers (IS-account identifiers) that correspond to internal accounts maintained by the originating system (OS-internal accounts) and to map IS-account identifiers back to their corresponding OS-internal accounts.

The originating system 110 also includes an OS data store 116. This is used to store data that is used by the originating system 110 during its operation.

The originating system 110 also includes one or more client endpoints 118. A client endpoint 118 may, for example, be provided by a web server or application server which a client application (e.g. OS client application 132) can connect to/communicate with in order to interact with the originating system 110 and perform 'normal' originating system operations.

The originating system 110 is described and illustrated as including a separate originating system application 112, IS account service 114, and data store 116. The functions described as being provided by these components could, however, provided by a single application or by additional/alternative applications working together.

Furthermore, various architectures for the originating system 110 are possible.

For example, originating system 110 may be a scalable system in which resources (e.g. compute nodes) are commissioned and decommissioned according to demand—e.g. in a public or private cloud-type system. In this case, the functionality provided by the originating system application 112, the IS account service 114, the OS data store 116, and or the client endpoint(s) 118 may be provided by independent applications running on one or more compute nodes (the one or more compute nodes provided by one or more computer processing systems).

As an alternative example, originating system 110 may run on a single server computing system, with the functionality of the endpoint 112, mapping service 114, data store 116 (and other 'normal' functionality of the originating system 110) all provided by a single, monolithic application.

Each external system 120 includes an external system application 122. Generally speaking the external system application 122 configures the external system 120 to receive data from and communicate data to the originating system 110 (e.g. from the originating system application 112).

Each external system 120 also includes an external system data store 124.

Each external system 120 also includes one or more client endpoints 126. A client endpoint 126 may, for example, be provided by a web server or application server which a client application (e.g. ES client application 134) can connect to/communicate with in order to interact with the external system 120 and perform 'normal' external system operations.

As with the originating system 110, a given external system 120 may have any appropriate architecture. For example, the functions described as being provided by the external system application 122 and external system data store 124 may be provided by a single computer processing system or multiple computer processing systems in communication with one another.

In the present context, system 110 is referred to as an 'originating' system as, relevantly to present disclosure, it generates data to be communicated to and stored at one or more "external" systems 120. Similarly, for the purposes of the present disclosure the relevant operations of a given "external" system 120 involve receiving data from the originating system 110. A given system may, however, operate as both an external system and an originating system—i.e. an external system in certain system interactions and originating system in others.

Given this, originating and external systems 110 and 120 may be any type of systems that have relevant cause to receive and send data to one another.

A client system 130 is a system used by an end user of a originating system 110 and/or external system 120 to interact with that/those systems.

In the present example, a client system 130 may host an originating system client application 132. When executed, the OS client application 132 configures the client system 130 to provide client-side functionality for the originating system 110, including communicating data to/receiving data from the originating system 110 (and, in this example, a client endpoint 118 of the originating system).

A client system 130 may also, or alternatively, host an external system client application 134. When executed, the ES client application 134 configures the client system 130 to provide client-side functionality for a particular external system 120 (e.g. system 120A), including communicating data to/receiving data from an external system 120 (and, in this example, a client endpoint 126 of the external system).

The OS client application 132 and/or ES client application 134 may be a general web browser application (such as Chrome, Safari, Internet Explorer, Opera, or an alternative web browser application) which accesses the relevant client endpoint 118 or 126 via an appropriate uniform resource locator (URL) and communicates via general world-wide-web protocols (e.g. http, https, ftp). Alternatively, the OS client application 132 and/or ES client application 134 may be a native application programmed specifically to communicate with the relevant client endpoint 118 or 126 using defined application programming interface (API) calls. In some cases a single application (e.g. a web browser application) may serve as both an OS client application 132 and an ES client application 134.

The features and techniques described herein are implemented using one or more computer processing systems.

For example, in networked environment 100 described above, the functions of the originating system 110 and each external system 120 are provided by one or more computer processing systems—e.g. one or more server systems. For example, where the originating system 110 is a scalable system, multiple originating system applications 112 may be operational, each running on a compute node which, in turn, will be running on one or more physical computer systems. As a further example, the originating system data store 116 may run on its own computer system (or group of computer systems) which includes (for example) a database server in communication with one or more storage devices.

Similarly, a client system 130 will typically be a computer processing system such as a desktop computer, laptop computer, tablet device, smart phone device or the like.

Figure 2:
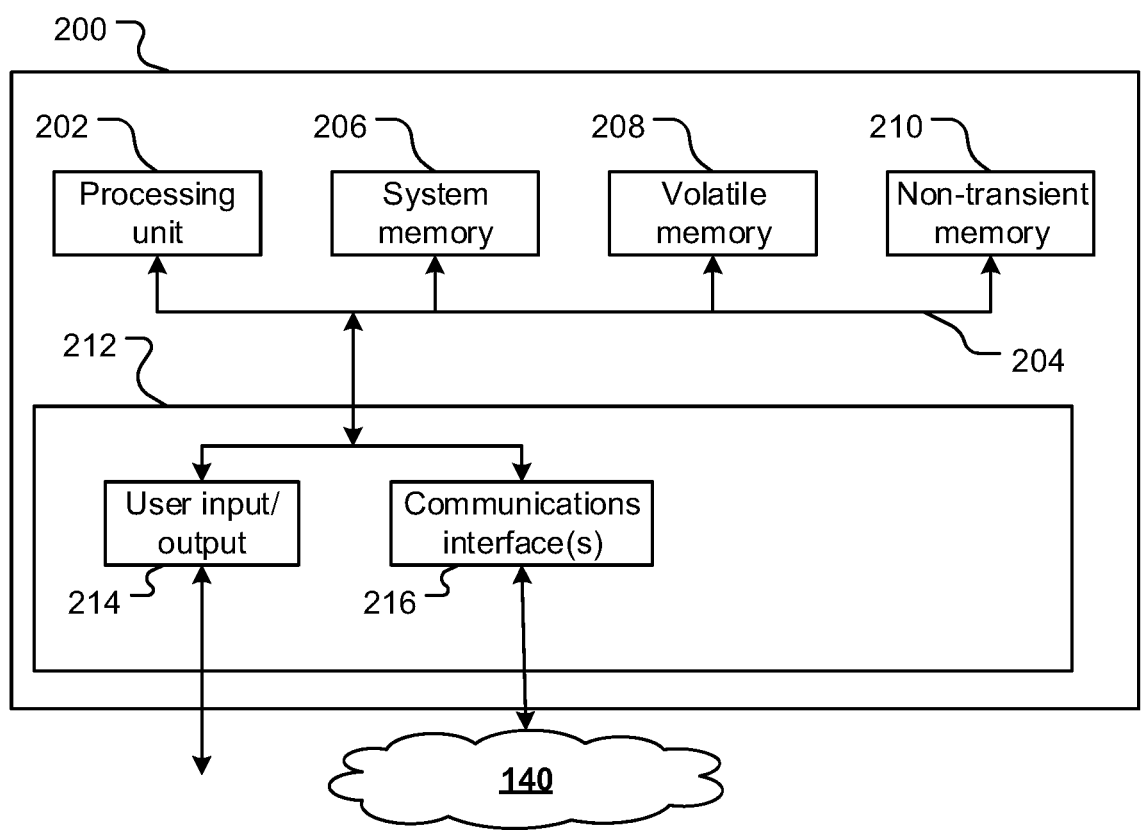
FIG. 2 is a block diagram of a computer processing system configurable to perform various features of the present disclosure.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire; eSATA; Thunderbolt; Ethernet; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth; WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output devices to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, and other input devices. System 200 may also include or connect to one or more output devices to output information. Such output devices may include display devices and/or other output devices. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 140 of environment 100 (and/or a local network within the OS 102 or external system 120). Via the communications interface(s) 216 system 200 can communicate data to and receive data from networked devices, which may themselves be other computer processing systems.

System 200 may be any suitable computer processing system, for example, a server computer system, a desktop computer, a laptop computer, a tablet computing device, a mobile/smart phone, or an alternative computer processing system. In the present context, however, the originating system 110 and each external system 120 will typically include one or more server computer systems.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over an interface such as communications interface 216.

Applications accessible to system 200 will typically include an operating system application such as Microsoft Windows®, Apple OSX, Unix, Linux, or an alternative operating system.

System 200 also stores or has access to applications which, when executed by the processing unit 202, configure system 200 to perform various computer-implemented processing operations described herein. For example, and referring to the networked environment of FIG. 100 above, the originating system 110 includes (inter alia) at least one originating system application 112 which will typically be provided by a server application of some description.

In some cases part or all of a given computer-implemented method will be performed by system 200 itself, while in other cases processing may be performed by other devices in data communication with system 200.

In order to provide services, the originating system 110 maintains account data (e.g. in the OS data store 116). For each unique account, the account data includes a unique account identifier. This will be referred to as the OS-internal account identifier. A given OS-internal account identifier is associated with other data relevant to operation of the originating system 110, for example in a relational database or other data structure/set of data structures.

The data associated with an OS-internal account identifier will depend on the services provided by the originating system 110 and the type of account. By way of example, however, account data will typically include administrative account data—e.g.: name data (e.g. first name, last name, service name (in the case of a programmatic user), and/or other name data); contact data (e.g. email address, phone number, URL, and/or other contact data); credential data; permission data; group membership data; and/or any other relevant data.

During operation, originating system 110 will receive and generate additional data that is associated with one or more OS-internal account identifiers. This additional data will depend on the type of the originating system 110 and the services it provides/functions it performs. For example, if originating system 110 is an issue tracking system, this may include data such as issue type definitions, issue work flows, team data, actual issue data, and other data.

In the present disclosure, the originating system 110 also causes data to be communicated to one or more external systems 120 (and retrieves data from one or more external systems 120). Data communicated to an external system 120 is associated with one or more OS-internal accounts. The form and content of this data will also depend on the types of the originating and external systems 110 and 120, and the purpose for which the data is generated/communicated to a given external system 120.

In order for the originating system 110 to associate data communicated to a given external system 120 with a particular OS-internal account, the originating system 110 could include its own OS-internal account identifiers in the data being communicated. This approach, however, has various disadvantages. For example, if the OS-internal account identifiers include any personal information (for example where an identifier includes part or all of a user's name, birth date, or any other identifying information) providing this to an external system 120 is undesirable from a privacy perspective. Even if an OS-internal account identifier does not include any personal information (e.g. is a pseudonymised identifier), providing the OS-internal account identifier to multiple external systems 120 is undesirable as if there are security breaches in those external systems the use of a common/consistent account identifier may allow disparate information in respect of a particular user to be joined together.

In order to address this risk, the present disclosure provides mechanisms by which a given OS-internal account identifier is associated with a different account identifier for each different external system 120. Generally speaking this involves the originating system 110 generating what will be referred to as inter-system account identifiers (IS account identifiers for short).

Two different embodiments will be described. In the first embodiment, described with reference to FIGS. 3 and 4, the originating system 110 generates inter-system account identifiers for external systems 120 and stores them. In the second embodiment, described with reference to FIGS. 5 and 6, the originating system 110 generates inter-system account identifiers but does not store them.

In both embodiments, the general context is that the operations of the originating system 110 cause it to generate and communicate data to one or more external systems 120. The data communicated to a given external system 120 is associated with a particular originating system account. To facilitate this, the originating system 110 generates an IS account identifier that is associated with (or maps to) the particular originating system account. The IS account identifier is then provided to the external system 120. When the originating system 110 receives or retrieves data back from an external system 120, the originating system 110 can use the IS account identifier to determine the originating system account in question.

The IS account identifier generated by the originating system 110 is unique to the particular external system 120: i.e. for a given OS-internal account, the corresponding IS account identifier generated for one external system (e.g. 120A) will be different to the corresponding IS account identifier generated for another external system (e.g. 120B and/or 120n).

Certain operations described with respect to FIGS. 3, 4, 5, and 6 are described as being performed by specific components of the originating system 110—e.g. the originating system application 112 and the IS account service 114. Operations could, however, be performed by alternative originating system components or applications. Accordingly, any operation described as being performed by a particular originating system component could more generally be described as being performed by the originating system 110.

Figure 3:
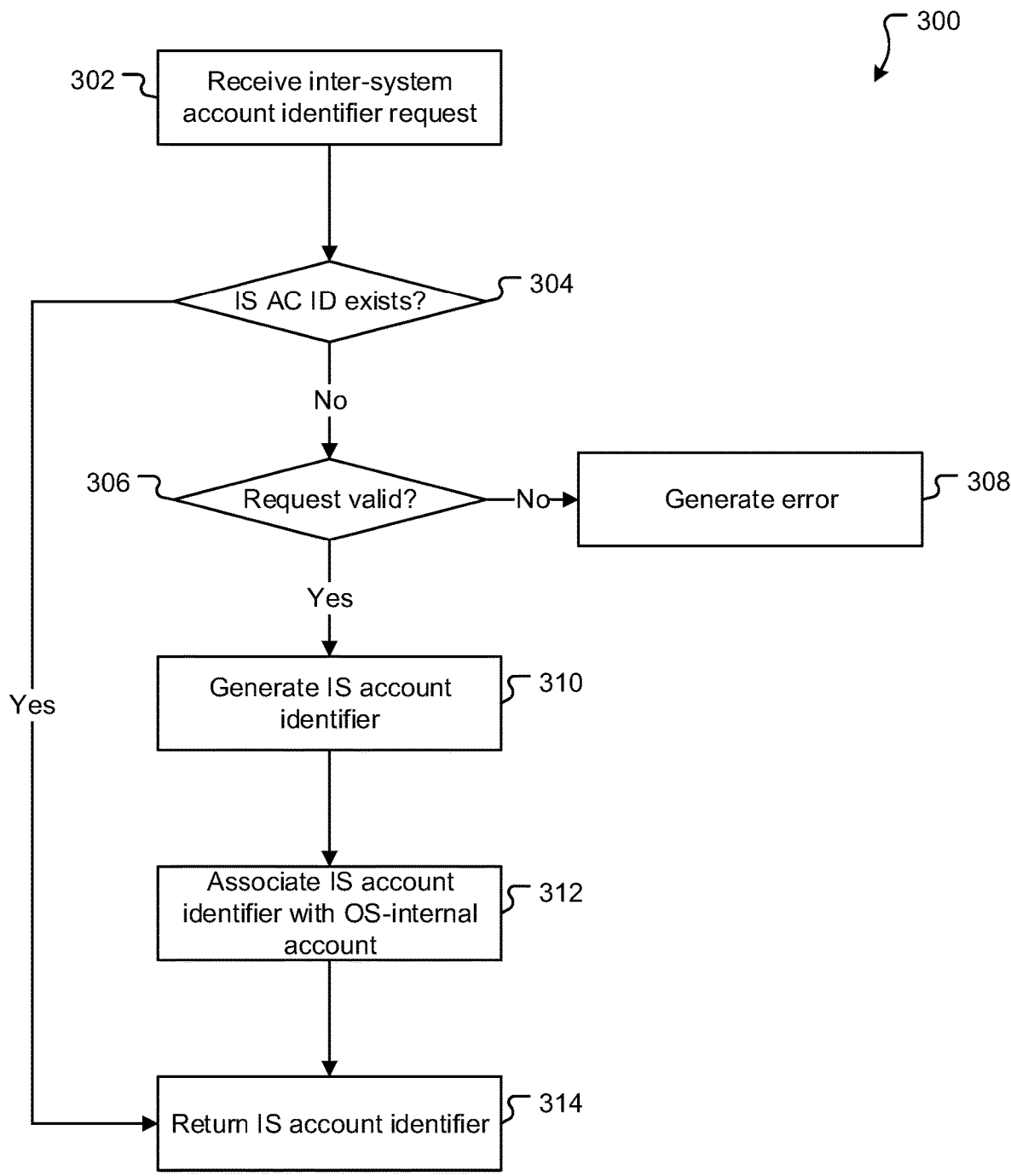
FIG. 3 depicts a computer implemented process for generating an inter-system account identifier.

FIG. 3 depicts operations 300 involved in generating IS account identifiers that correspond to OS-internal accounts.

At 302, the IS account service 114 receives an IS account identifier request. The IS account identifier request identifies a specific external system 120 (e.g. 120A) and a specific OS account (e.g. via an OS-internal account identifier or other account data that allows the OS account to be identified).

The inter-system account identifier request may be received in various ways. In one example, the inter-system account identifier generation request is generated by the OS application 112 when the OS application 112 needs to communicate data relating to an OS-internal account to a particular external system 120.

At 304, the IS account service 114 determines if an IS account identifier exists for the specific OS-internal account and specific external system identified in the request.

In the present example, in order to determine if an IS account identifier exists the IS account service 114 queries an inter system accounts data structure as described below (using, for example, an identifier of the specific external system and an identifier of the specific OS-internal account).

If an IS account identifier exists processing continues to 314 where the IS account identifier is returned. If not, processing continues to 306.

At 306, the IS account service 114 determines if the request received at 302 is valid. Various checks may be made in this determination.

For example, the IS account service 114 may determine if the specific external system 120 identified in the request is an eligible external system (e.g. has been set up/registered with originating system 110). The IS account service 114 may also, or alternatively, determine if the specific OS-internal account identified in the request is eligible for corresponding IS account creation.

If, at 306, the IS account service 114 determines the request is not valid, processing proceeds to 308. At 308, the IS account service 114 generates/returns an error. The error will depend on the reason the request is determined to be invalid. For example, the error may indicate: the specific external system is not eligible (and may include a redirect to a process for registering/integrating the specific external system 120 with the originating system 110); that the specific OS-internal account cannot be linked to the specific external system 120; and/or other error indications.

If, at 306, the IS account service 114 determines the request is valid, processing proceeds to 310. At 310, the IS account service 114 generates an inter-system account identifier (an IS account ID).

As noted above, the IS account identifier is generated to be unique to the specific external system 120 identified in the request. For example, if the IS account service 114 receives requests to generate account identifiers corresponding to OS-internal account '0001' for both external system 120A and external system 120B, the IS account identifier generated for external system 120A will be different to the IS account identifier generated for external system 120B.

The IS account service 114 can be configured to generate the IS account identifier at 308 in various ways.

For example, at 308 the IS account service 114 may randomly generate an x character string to be the IS account identifier (x being any appropriate integer—e.g. 8, 16, 32, 64, or an alternative integer). If the randomly generated string is not already in use as an IS account identifier it is accepted as the IS account identifier, otherwise it is rejected and a new string is generated (the process repeating until a string that is not currently in use as an IS account identifier is generated).

As an alternative example, the account mapping service can be configured to generate the IS account identifier by calling a universally unique identifier (UUID) generation function to generate a UUID (the UUID then being used as the IS account identifier).

At 312, the IS account service 114 associates the IS account identifier generated at 310 with the specific OS-internal account identified in the request. In the present embodiment, the IS account identifier is also associated with an identifier of the specific external system 120A that the IS account identifier has been generated for.

In the present embodiment, this association is performed by creating and storing a record in an OS inter-system accounts data structure. The specific content and format of such a data structure (and specific records therein) may vary. By way of example, however, an inter-system accounts data record may be a tuple as follows: {OS-internal account identifier; external system identifier; IS account identifier}.

In this example: the OS-internal account identifier is the originating system's internal account identifier for the specific account. The external system identifier is an identifier of the specific external system 120. The IS account identifier is the account identifier generated at 308.

In this case, the OS inter-system accounts data structure may be represented as a table as follows:

| OS-internal account ID | External system ID | IS account ID |
|---|---|---|
| 0001 | 120A | 217655138 |
| 0001 | 120B | 569488698 |
| 0001 | 120n | 834905185 |
| 0002 | 120A | 011432856 |
| 0002 | 120B | 632560783 |
| 0002 | 120n | 305549039 |
| ... | ... | ... |
| 7786 | 120A | 055231844 |
| 7786 | 120B | 173684890 |
| 7786 | 120n | 312499796 |

In this example, IS account identifiers corresponding to the OS-internal account with identifier 0001 have been generated and stored for each of three external systems (with external system identifiers 120A, 120B, and 120n). As can be seen, the IS account identifiers corresponding to originating system account 0001 are all different. Accordingly, even if communications are intercepted and/or external systems 120A, 120B, and 120n are compromised there is no way to immediately determine that IS account identifiers 217655138, 569488698, and 834905185 (and any data associated therewith) actually relate to the same (originating system) account.

In alternative embodiments, inter-system accounts records may not include an identifier of the external system. In this case, however, IS account identifiers must be generated to be globally unique to prevent the possibility of lookup collisions occurring.

At 314, the IS account service 114 causes the IS account identifier that corresponds to the specific external system and specific OS-internal account identified in the request to be returned.

Ultimately, the IS account identifier is included in a data communication communicated to the specific external system 120A. In some cases the external system 120A may not need to do anything with the IS account identifier, and simply stores the communication received from the originating system 110 in the way it normally would. In other cases, the external system 120A may be configured to associate the IS account identifier with an internal resource maintained by the external system 120A.

For example, on receiving a communication with an IS account identifier, the external system 120 may associate the IS account identifier with an internal resource identifier (referred to as an ES-internal identifier) that corresponds to a particular account or resource maintained by the external system 120. The external system 120 may store the IS account identifier in an ES inter-system accounts data structure (in the external system data store 124), similar to the OS inter-system accounts data structure described above. For example:

| ES-internal ID | originating system ID | IS account ID |
|---|---|---|
| ABCD | 110 | 217655138 |
| EFGH | 110 | 011432856 |
| ... | ... | ... |
| IJKL | 110 | 055231844 |

In this example, a given ES inter-system accounts data record includes: the IS account identifier generated by the originating system 110; the external system's internal identifier that the IS account identifier is associated with; and an identifier of the originating system 110 (which may not be necessary if the external system only communicates data to a single originating system).

Figure 4:
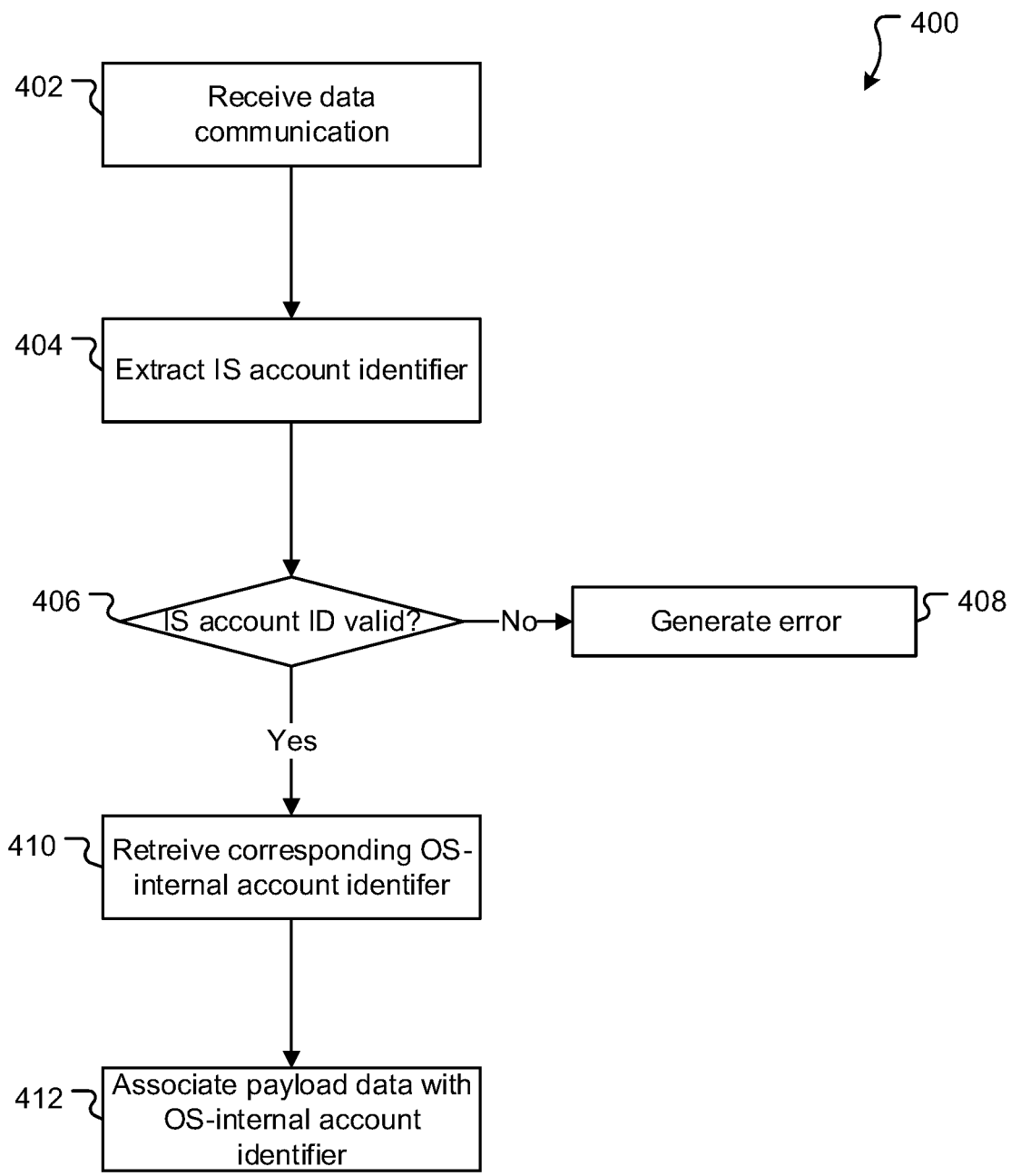
FIG. 4 depicts a computer implemented process for associating incoming data with an internal system account.

Turning to FIG. 4, operations 400 performed by the originating system 110 when receiving or retrieving data that includes an IS account identifier from an external system 120 will be described.

At 402, the originating system 110, for example the originating system application 112 or an alternative endpoint, receives an data communication that includes an IS account identifier from an external system 120.

The received data communication is generated by an external system 120 at a point in its operation where it needs to send data to the originating system 110 to be associated with a particular OS-internal account. This may be due to a request for data received from the originating system 110, or due to other operations of the external system 120. The external system 120 generates the data communication to include an IS account identifier that was originally generated by the originating system 110 for the external system 120 (e.g. at 310 above).

The external system 120 also generates and includes payload data in the communication—i.e. the data the external system 120 is communicating to the originating system 110 for association with a particular OS account. The format and content of the payload data will depend entirely on the types of the external and originating systems and the communication in question.

The data communication may also include, or be associated with, an identifier of the external system 120 that is sending the data. The external system identifier may be an explicit field in the data communication or may be determined from other data (e.g. the manner in which the external system 120 connects to the originating system 110, credentials being used to access the originating system 110, or other data).

At 404, the originating system 110 (e.g. the originating system application 112) extracts the IS account identifier from the data communication and (in the present example) passes the IS account identifier to the IS account service 114.

At 406, the IS account service 114 determines if the IS account identifier is valid. This may involve, for example, determining if the IS account identifier exists in an OS inter-system accounts data structure (and, if external system identifiers are stored/used, that the IS account identifier is associated with the identifier of the external system the incoming data communication was received from).

If, at 406, the IS account identifier is not valid, processing continues to 408. At 408, the IS account service 114 generates an error message and returns this. The error message indicates to the relevant application (e.g. the originating system application 112) that an OS-internal account corresponding to the IS-account identifier cannot be identified and, therefore, the data received in the payload of the communication cannot be associated with an OS internal account.

If, at 406, the IS account identifier is valid, processing continues to 410. At 410, the IS account service 114 retrieves the OS-internal account identifier corresponding to the IS account identifier extracted from the communication at 404 and returns this to the relevant application (e.g. the originating system application 112).

In the present example, determining validity of the IS account ID (at 406) and retrieving the corresponding OS-internal account ID involves querying the OS inter-system accounts data structure using the IS account identifier (and, where used, the relevant external system identifier).

Continuing with the above example, if the incoming data communication is received from external system 120A and the IS account identifier is '217655138', the corresponding OS-internal account identifier is determined (by looking up the OS inter-system accounts data structure) to be '0001'.

At 412, the originating system 110 (e.g. the originating system application 112) has received the relevant OS-internal account identifier. In this case it processes the payload data to associate it (or data based thereon) with the OS-internal account identifier retrieved at 410. The may involve, for example, storing the payload data (or data based thereon) in the OS data store 116. The precise processing of the payload data and the manner in which it is stored will again depend on the types of the originating and external systems and the purpose of the data communication. Associating the payload data with the OS-internal account identifier may, for example, involve writing data to one or more relational database tables, the data being associated with the OS-internal account by use of the OS-internal account identifier as a key.

The embodiment described above with reference to FIGS. 3 and 4 addresses the potential privacy issue associated with providing multiple external systems 120 with a common identifier for a given (same) originating system account.

In implementations with large numbers of accounts and/or large numbers of external systems, however, the amount of account correspondence data that needs to be stored (for example in the OS inter-system accounts data structure) and, therefore, the processing required to look up account correspondence data, increases. For example, if originating system 110 maintains 1,000,000 accounts and (on average) each account is integrated with 20 external systems, the account correspondence data will include 20,000,000 records. This can present a data storage issue, but also lookup time—e.g. the amount of time taken to either generate new IS account identifiers (in particular checking duplicate identifiers are not used) and/or IS account identifier lookup in order to determine the specific OS-internal account identifier associated with a particular IS account identifier.

Figure 5:
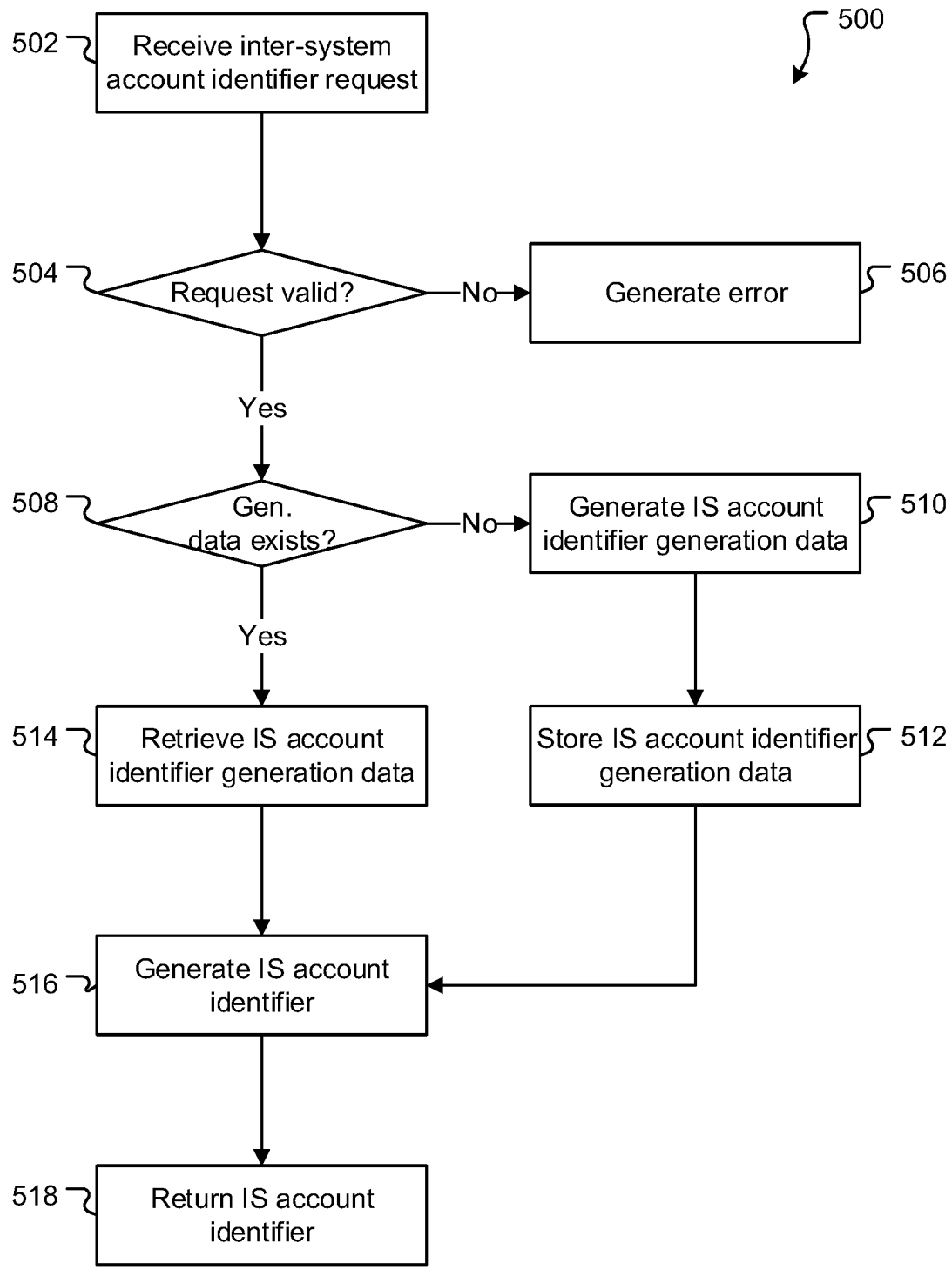
FIG. 5 depicts an alternative computer implemented process for generating an inter-system account identifier.
Figure 6:
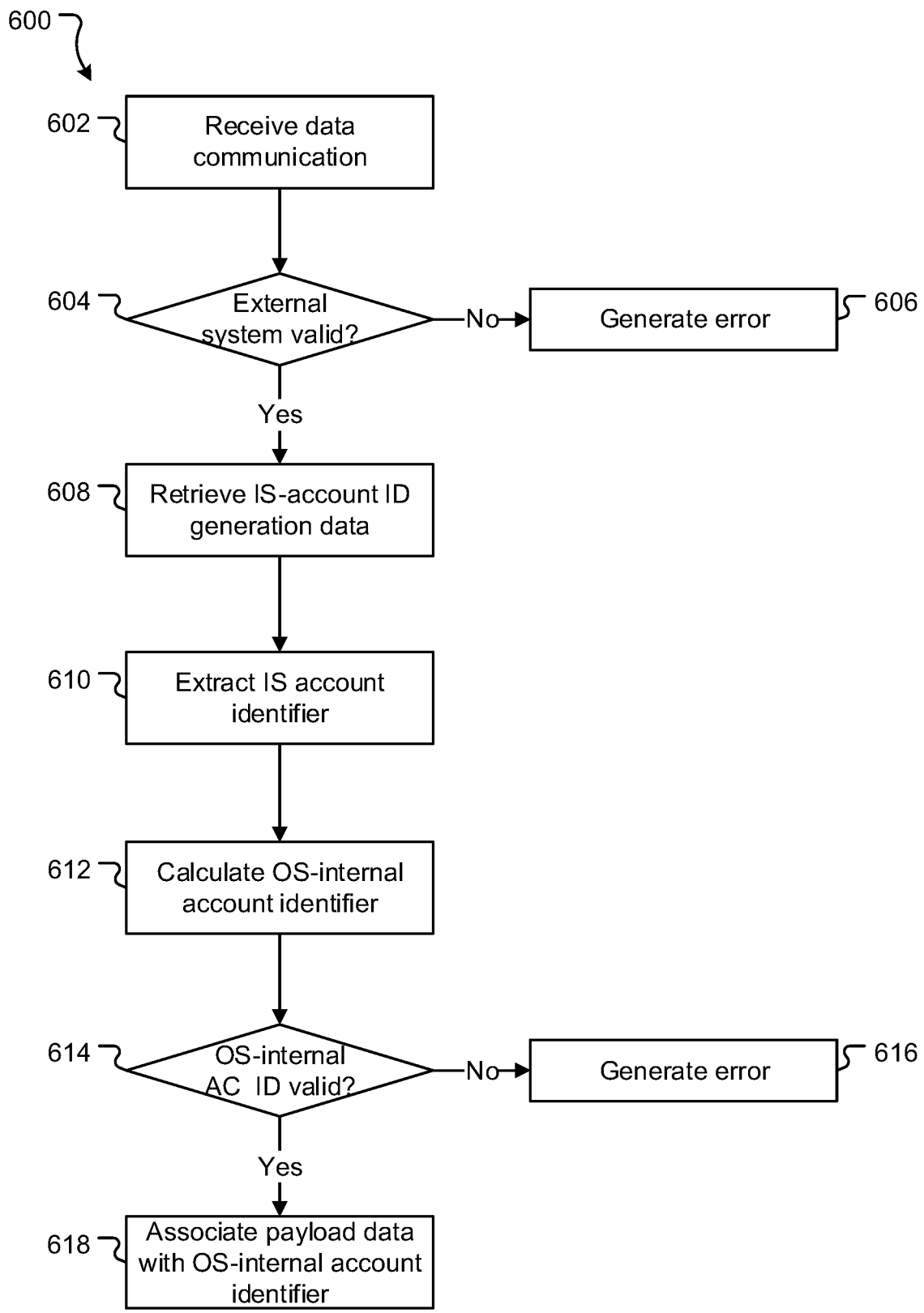
FIG. 6 depicts an alternative computer implemented process for associating incoming data with an internal system account.

The second embodiment, which will be described with reference to FIGS. 5 and 6, provides an alternative approach. Several operations performed in the second embodiment are the same (or substantially similar) to operations performed in the first embodiment. In this case the operations will not be described in detail again.

As described further below, in this embodiment the originating system 110 (and in particular the IS account service 114) associates each external system 120 with inter-system account identifier generation data. As with the previous embodiment, this association may be achieved, for example, by storing data in an OS inter-system accounts data structure (maintained, for example, in the OS data store 116). The OS inter-system accounts data structure of the present embodiment is separate to/replaces the data structure of the embodiment described with reference to FIGS. 3 and 4 above.

Once again, the specific content and format of such an OS inter-system accounts data structure may vary. By way of example, however, in the present embodiment OS inter-system accounts data structure records may be in the form of a tuple such as: {external system identifier; IS account identifier generation data}.

In this example, the external system identifier is an identifier of a specific external system 120 and the IS account identifier generation data is the IS account identifier generation data associated with that external system. For example:

| External system ID | IS account identifier generation data |
|---|---|
| 120A | 49MM8187F38G3973H58CC1875I40C797 |
| 120B | QH5280X15UB4568L58V1673U74DS6675 |
| ... | ... |
| 120n | GY7678Y52OM6774Y76F1870S80WY6486 |

When an IS account identifier needs to be generated for a particular OS-internal account and particular external system, the originating system 110 does so using the IS account identifier generation data associated with the particular external system and the relevant OS-internal account identifier.

Different types of IS account identifier generation data and different algorithms for using that data to generate an IS account identifier are possible. Generally speaking, however, in certain embodiments the data and algorithm are such that generation of an IS account identifier is consistent, reversible and secure.

Consistent in this sense means that given a certain internal identifier (i.e. a certain OS-internal account identifier), the same result (IS account identifier) will be obtained.

Reversible in this sense means that the originating system 110 (in particular the IS account service 114) can process an IS account identifier it has generated in order to determine the corresponding OS-internal account identifier.

Secure in this sense means that an external system or party should not be reasonably able to derive an OS-internal account identifier from its corresponding IS account identifier alone.

In one implementation, the IS account identifier generation data generated and stored for each external system is an encryption key.

In this case, the encryption key (i.e. the IS account identifier generation data) may be generated in any appropriate manner, for example by invoking a random number generation process that generates a string of the desired key length for the encryption algorithm.

To generate an IS account identifier corresponding to a particular OS-internal account identifier for a particular external system 120, the originating system 110 encrypts the particular OS-internal account identifier using an encryption algorithm and the IS account identifier generation data associated with the particular external system (i.e. the external system's encryption key). The encrypted OS-internal account identifier is then used as the IS account identifier.

Similarly, when an incoming data communication including a IS account identifier is received the originating system 110 decrypts the IS account identifier (using the relevant encryption key) to determine the OS-internal account identifier.

Any appropriate encryption algorithm can be used, provided the algorithm provides (or can be configured to provide) consistency. As one example, consistency can be achieved by using the RSA algorithm to encrypt consistent length messages that correspond to internal accounts. In this case, a single RSA key is generated for each external system 120 and stored. In order to generate an IS account identifier for a given internal account and a given external system 120, the key for the external system 120 is retrieved and used to encrypt a consistent length message that corresponds to the given internal account. The encrypted consistent length message is then used as the IS account identifier. Each external system 120, therefore, has its own key (IS account identifier generation data), though the key is not known to the external system 120.

A consistent length message corresponding to a given internal account can be generated in various ways. As one example, a message format that includes a length field, the internal account identifier in question, and any padding required to make the message the length specified in the length field may be used. E.g. a message of the format <length field:internal account identifier:padding>. In this example, the length field is distinguished from the internal account identifier using a known character (':'), however alternative implementations can be adopted (e.g. by providing a fixed size 'length field', ensuring that fixed size is sufficient to describe the longest value expected for the internal account identifier). Where padding is required in order to make a given message that corresponds to a particular internal account the correct length, any appropriate padding can be used provided it is consistent—e.g. padding by insertion of a predefined character such as '0' or any other character/sequence of characters.

Alternative encryption algorithms and/or mechanisms for ensuring consistency may be used.

FIG. 5 depicts operations 500 involved in generating inter-system account identifiers that correspond to OS-internal accounts.

At 502, the IS account service 114 receives an inter-system account identifier request. This is the same as (or similar to) operation 302 described above, the request identifying a specific external system 120 (e.g. 120A) and a specific OS-internal account.

At 504, the IS account service 114 110 determines if the request received at 502 is valid. This is the same as (or similar to) operation 306 described above.

If, at 504, the IS account service 114 determines the request is not valid, processing proceeds to 506 to generate an error. This is the same as (or similar to) operation 308 described above.

If, at 504, the IS account service 114 determines the request is valid, processing proceeds to 508. At 508, the IS account service 114 determines if IS account identifier generation data (as described above) exists for the specific external system identified in the request received at 502. In the present embodiment the determination at 508 is made by querying the OS inter-system accounts data structure using an identifier of the external system in question.

If, at 508, the originating system 110 determines that IS account identifier generation data does not exist for the specific external system processing proceeds to 510. Otherwise, processing proceeds to 514.

At 510, the IS account service 114 generates IS account identifier generation data for the specific external system 120. As discussed above, in one example the IS account identifier generation data is a randomly generated string which serves as an encryption key for a symmetric encryption algorithm.

At 512, the IS account service 114 stores the IS account identifier generation data, e.g. in an OS inter-system accounts data structure (stored in the OS data store 116) as described above. Processing then continues to 516.

At 514, the IS account service 114 retrieves the IS account identifier generation data that already exists for the specific external system. Processing then continues to 516.

At 516, the IS account service 114 generates an IS account identifier in respect of the specific OS-internal account and specific external system 120 identified in the request received at 502.

The IS account service 114 generates the IS account identifier based on the OS-internal account identifier (which, if not included in the request received at 502, is retrieved by an appropriate lookup operation) and the IS account identifier generation data that is associated with the specific external system identified in the request received at 502 (e.g. as retrieved from the inter-system accounts data structure at 514 or as generated at 510). As described above, in one example the IS-account identifier is generated by encrypting the OS-internal account identifier using the IS account identifier generation data as the encryption key.

At 518, the IS account service 114 returns the IS account identifier generated at 516. This is the same as (or similar to) operation 314 described above.

In the operations described above, the originating system 110 generates and stores IS account identifier generation data (at 510 and 512) in response to receiving an inter-system account identifier generation request and determining that such data does not exist. The originating system 110 may also (or alternatively) generate and store IS account identifier generation data for one or more external systems as part of a separate/independent process. For example, originating system 110 may provide a mechanism by which users can integrate one or more external systems 120 with the originating system 110 (e.g. via a client system 130 running an OS client application 132). As part of such an integration process the originating system 110 may generate and store IS account identifier generation data for the external system 120 being integrated for downstream use.

Notably, in the embodiment described with reference to FIGS. 5 and 6, the originating system 110 does not store individual IS account identifiers. Rather, for each external system 120 the originating system 110 stores IS account identifier generation data which is used to generate a IS account identifiers. As a result, the originating system 110 only has to store a single data item for each external system 120 (the IS account identifier generation data) irrespective of how many IS account identifiers need to be created for that external system 120 (each IS account identifier corresponding to a different OS-internal account identifier).

Turning to FIG. 6, operations 600 performed by the originating system 110 when receiving data from an external system 120 will be described.

At 602, the originating system 110 receives an incoming data communication from an external system 120. This is the same as (or similar to) operation 402 described above. The incoming data communication includes an IS account identifier and payload data. The incoming data communication also includes, or is associated with, an identifier of the external system 120 that is sending the data.

At 604, the IS account service 114 determines if the external system 120 identified in/associated with the request is valid. In the present example this involves determining if a record including the external system identifier is present in the inter-system accounts data structure. If not, the external system 120 is not valid and processing proceeds to 606. If so, processing proceeds to 608.

At 606, the IS account service 114 generates an appropriate error (e.g. indicating the external system cannot be identified) and returns this (e.g. to the OS application 112). In alternative embodiments, the IS account service 114 may simply cease processing in respect of the incoming data communication without generating/returning an error.

At 608, the IS account service 114 retrieves the IS-account identifier generation data that is associated with the external system 120 that the data communication was received from. In the present example this involves querying the OS inter-system accounts data structure using the external system identifier.

At 610, the IS account service 114 extracts the IS account identifier from the incoming data communication received at 602 (or receives the IS account identifier from an alternative component—e.g. the OS application 112).

At 612, the IS account service 114 calculates an OS-internal account identifier based on the IS account ID generation data (retrieved at 608) and the IS account identifier (extracted/received at 610). As described above, in one example the IS account ID generation data is an encryption key and calculating the OS-internal account identifier involves decrypting the IS account identifier extracted at 610 using that key.

At 614, the IS account service 114 determines if the OS-internal account identifier calculated at 612 is valid. This may involve, for example, determining if an OS-internal account with the identifier calculated at 612 actually exists. If not, processing proceeds to 616. If so, processing proceeds to 618.

At 616, the IS account service 114 generates an appropriate error (e.g. indicating the IS account identifier does not correspond to an OS-internal account) and returns this. In alternative embodiments, the IS account service 114 may simply cease processing in respect of the incoming data communication without generating/returning an error.

At 618, a valid OS-internal account identifier has been calculated. In this case, the originating system 110 processes the payload data to associate it (or data based thereon) with the OS-internal account identifier calculated at 610. This is the same as (or similar to) operation 412 described above.

In the embodiment of FIGS. 5 and 6 described above, a symmetric encryption key is provided as one example of IS account ID generation data. As a further example, the embodiment of FIGS. 5 and 6 could be adapted to make use of an asymmetric encryption key.

In this case, generating IS account identifier generation data at 510 involves generating asymmetric encryption key pair (including an encrypt key and a decrypt key). At 512, the IS account service 114 would then store both the encrypt and decrypt key. The OS inter-system accounts data structure described above may be adapted to do so, for example by including a separate decryption key field (e.g. {External system identifier; IS account identifier generation data (e.g. encryption key); IS account identifier decryption data (e.g. decryption key)}) or by making the IS account identifier generation data field itself a tuple (e.g. {External system identifier; (encryption key, decryption key)}.

Furthermore, where an asymmetric encryption key is used: generating an IS account identifier at 516 is performed using the encrypt key for the external system in question; retrieving IS account ID generation data at 608 involves retrieving the decrypt key for the external system in question; and calculating the OS-internal account identifier at 612 involves using the decrypt key retrieved at 608.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:
1. A computer implemented method comprising:
receiving a first request at an originating system, the first request for accessing a first service at a first external system on behalf of a first internal account managed by the originating system;

in response to the first request, generating, by the originating system, a first inter-system identifier that is anonymized with respect to the first internal account and is unique with respect to other inter-system identifiers;
requesting the first service from the first external system using the first inter-system account identifier;
in response to receiving a first data communication having a first data payload from the first external system, associating the first data payload with the first internal account managed by the originating system;
receiving a second request at the originating system, the second request for accessing a second service at a second external system on behalf of the first internal account managed by the originating system;
in response to the second request, generating, by the originating system, a second inter-system identifier that is anonymized with respect to the first internal account and is unique with respect to other inter-system identifiers;
requesting the second service from the second external system using the second inter-system account identifier; and
in response to receiving a second data communication having a second data payload from the second external system, associating the second data payload with the first internal account managed by the originating system.

2. The computer implemented method according to claim 1, wherein:
the first inter-system account identifier is a first universally unique identifier; and
the second inter-system account identifier is a second universally unique identifier.

3. The computer implemented method according to claim 1, wherein generating a particular inter-system account identifier corresponding to a particular external system and a particular internal account comprises:
generating a random number;
determining if the random number is already in use as an inter-system account identifier; and
in response to determining that the random number is not already in use, using the random number as the particular inter-system account identifier.

4. The computer implemented method according to claim 1, further comprising:
storing the first inter-system account identifier in a data store in the originating system, the first inter-system account identifier being associated with the first internal account; and
storing the second inter-system account identifier in a data store in the originating system, the second inter-system account identifier being associated with the first internal account.

5. The computer implemented method according to claim 4, wherein:
the first inter-system account identifier is also associated with the first external system; and
the second inter-system account identifier is also associated with the second external system.

6. The computer implemented method according to claim 4, wherein:
associating a respective one of the first data payload and the second data payload with the first internal account comprises querying the data store in the originating system to determine that a respective one of the first inter-system account identifier and the second inter-system account identifier is associated with the first internal account.

7. The computer implemented method according to claim 1, wherein generating a particular inter-system account identifier corresponding to a particular external system and a particular internal account comprises:
retrieving particular inter-system account identifier generation data from a data store in the originating system, the particular inter-system account identifier generation data being associated with the particular external system; and
generating the particular inter-system account identifier using the particular inter-system account identifier generation data and an internal account identifier associated with the particular internal account.

8. The computer implemented method according to claim 7, wherein the particular inter-system account identifier is not stored by a system that generates the particular inter-system account identifier.

9. The computer implemented method according to claim 7, further comprising:
receiving a communication from a specific external system, the communication including a specific inter-system account identifier and a payload;
retrieving, from the originating system data store, inter-system account identifier generation data that is associated with the specific external system;
calculating an internal account identifier based on the specific inter-system account identifier included in the communication and the inter-system account identifier generation data that is associated with the specific external system; and
associating data based on the payload with the internal account identifier.

10. The computer implemented method according to claim 9, wherein:
the inter-system account identifier generation data that is associated with the specific external system includes a symmetric encryption key; and
calculation of the internal account identifier is based on the symmetric encryption key and the specific inter-system account identifier included in the communication.

11. The computer implemented method according to claim 9, wherein:
the inter-system account identifier generation data that is associated with the specific external system includes an encryption key and a decryption key; and
calculation of the internal account identifier is based on the decryption key and the specific inter-system account identifier included in the communication.

12. The computer implemented method according to claim 7, wherein prior to generating the particular inter-system account identifier corresponding to the particular external system and the particular internal account, the method further comprises:
generating the particular inter-system account identifier generation data; and
storing the particular inter-system account identifier generation data in the originating system data store, the particular inter-system account identifier generation data being associated with the particular external system.

13. An originating system comprising:
one or more processors;
one or more communications interfaces; and a non-transient computer-readable storage medium storing a set of instructions which, when executed by the one or more processors, cause the one or more processors to:
  receive, by the one or more communications interfaces, a first request for accessing a first service at a first external system on behalf of a first internal account managed by the originating system;
  in response to the first request, generate, by the one or more processors, a first inter-system identifier that is anonymized with respect to the first internal account and is unique with respect to other inter-system identifiers;
  request the first service from the first external system using the first inter-system account identifier;
  in response to receiving a first data communication having a first data payload from the first external system, associate the first data payload with the first internal account managed by the originating system;
  receive, by the one or more communications interfaces, a second request for accessing a second service at a second external system on behalf of the first internal account managed by the originating system;
  in response to the second request, generate, by the one or more processors, a second inter-system identifier that is anonymized with respect to the first internal account and is unique with respect to other inter-system identifiers;
  request the second service from the second external system using the second inter-system account identifier; and
  in response to receiving a second data communication having a second data payload from the second external system, associate the second data payload with the first internal account managed by the originating system.

14. The originating system to claim 13, wherein when executed, the sequences of instructions further cause the one or more processors to:
  store the first inter-system account identifier in a data store in the originating system, the first inter-system account identifier being associated with the first internal account; and
  store the second inter-system account identifier in a data store in the originating system, the second inter-system account identifier being associated with the first internal account.

15. The originating system according to claim 14, wherein when executed, the sequences of instructions further cause the one or more processors to:
  associate a respective one of the first data payload and the second data payload with the first internal account by querying the data store in the originating system to determine that a respective one of the first inter-system account identifier and the second inter-system account identifier is associated with the first internal account.

16. The originating system according to claim 13, wherein generating a particular inter-system account identifier corresponding to a particular external system and a particular internal account comprises:
  retrieving particular inter-system account identifier generation data from the data store in the originating system, the particular inter-system account identifier generation data being associated with the particular external system; and
  generating the particular inter-system account identifier using the particular inter-system account identifier generation data and an internal account identifier associated with the particular internal account.

17. The originating system according to claim 16, wherein the particular inter-system account identifier is not stored by the computer-based originating system.

18. The originating system according to claim 16, wherein when executed, the sequences of instructions further cause the one or more processors to:
  receive a communication from a specific external system, the communication including a specific inter-system account identifier and a payload;
  retrieve, from the originating system data store, inter-system account identifier generation data that is associated with the specific external system;
  calculate an internal account identifier based on the specific inter-system account identifier included in the communication and the inter-system account identifier generation data that is associated with the specific external system; and
  associate data based on the payload with the internal account identifier.

19. The originating system according to claim 18, wherein:
  the inter-system account identifier generation data that is associated with the specific external system includes a symmetric encryption key; and
  calculation of the internal account identifier is based on the symmetric encryption key and the specific inter-system account identifier included in the communication.

20. The originating system according to claim 18, wherein:
  the inter-system account identifier generation data that is associated with the specific external system includes an encryption key and a decryption key; and
  calculation of the internal account identifier is based on the decryption key and the specific inter-system account identifier included in the communication.

* * * * *